March 3, 1959 W. D. ALLISON 2,876,019
INERTIA CONTROL MEANS FOR LOAD COMPENSATOR MECHANISM
Filed Dec. 6, 1954 2 Sheets-Sheet 1
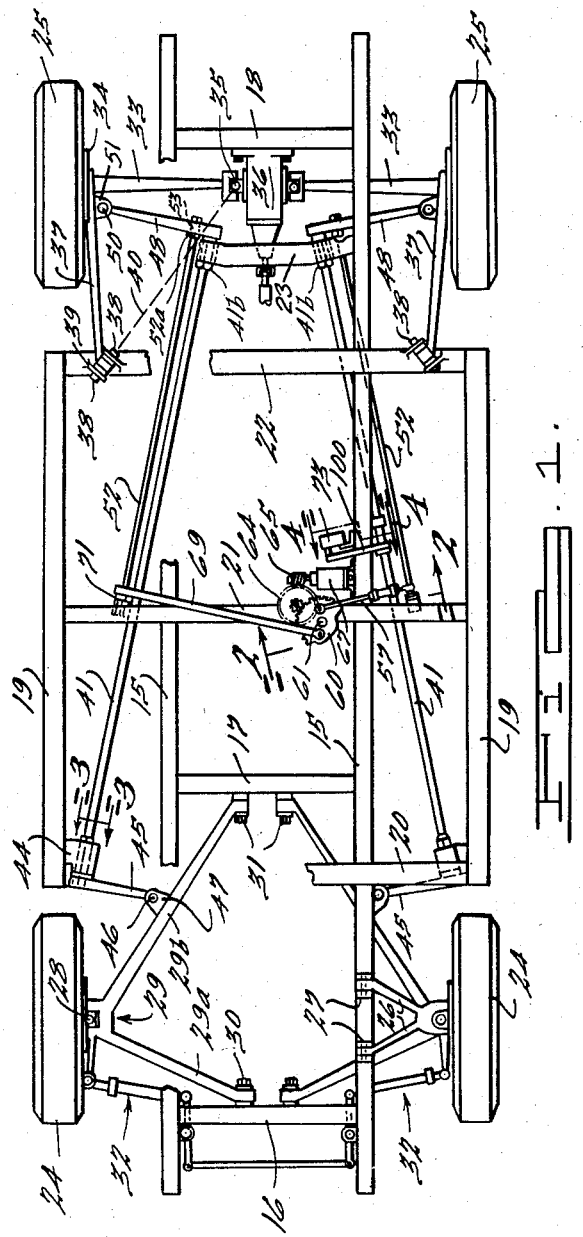
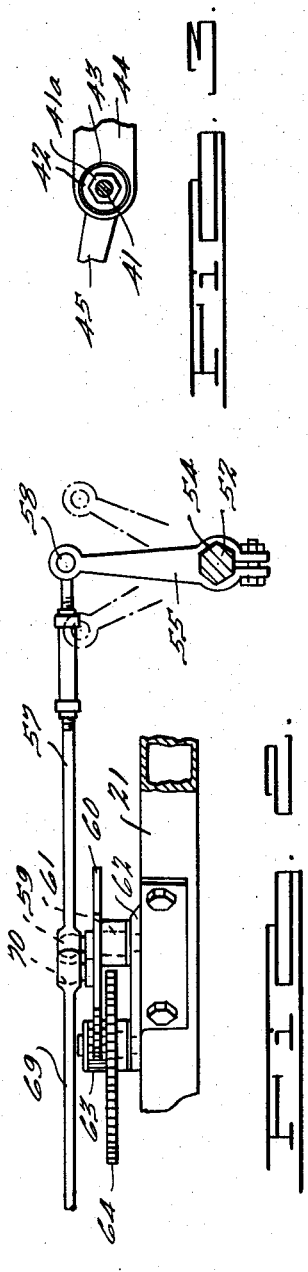
INVENTOR.
William D. Allison.
BY
Elmer Jamison Gray
ATTORNEY

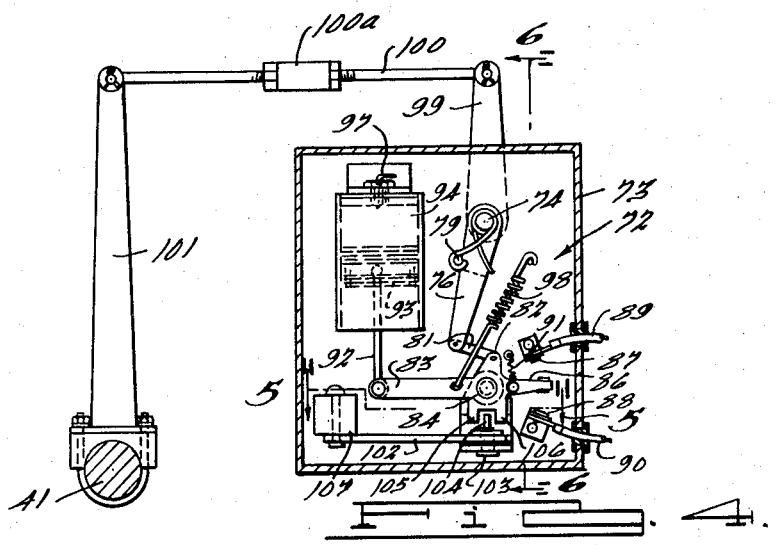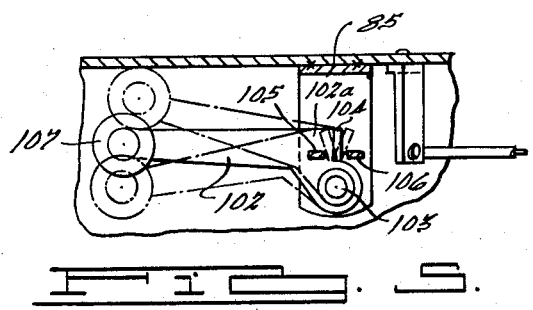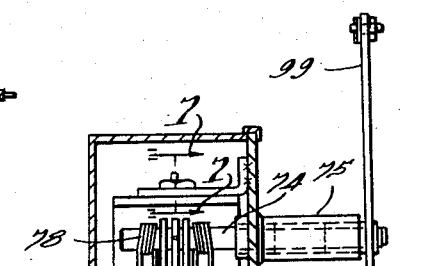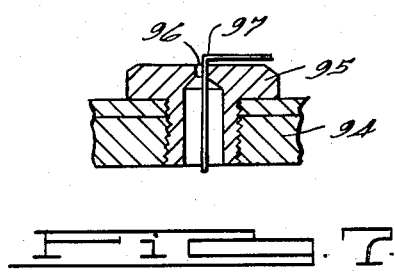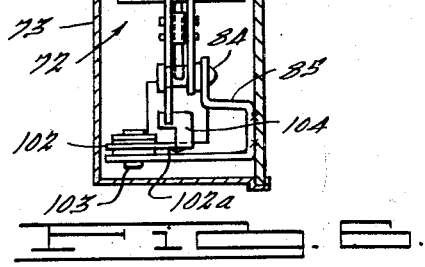

United States Patent Office 2,876,019
Patented Mar. 3, 1959

2,876,019

INERTIA CONTROL MEANS FOR LOAD COMPENSATOR MECHANISM

William D. Allison, Grosse Pointe Farms, Mich.

Application December 6, 1954, Serial No. 473,175

11 Claims. (Cl. 280—124)

This invention relates to motor vehicles and particularly to spring suspensions therefor. The invention is applicable to various types of motor vehicles such as automobiles of the so-called pleasure or passenger types, busses, trucks, ambulances and commercial vehicles. For the purposes of illustration the invention has been shown herein as embodied in a motor vehicle having a chassis or frame structure adapted to be utilized in a passenger or pleasure type vehicle.

The vehicle is provided with front and rear wheels and a main spring suspension or spring means interposed between the frame or body structure of the vehicle and the wheels. As a main spring means I prefer to utilize torsion bar or torsional spring means connecting each pair of front and rear wheels at a side of the vehicle in such manner as to enable vertical forces to be transmitted in corresponding directions to the vehicle frame adjacent opposite ends thereof in response to vertical motion of either wheel. In addition to the main spring suspension there is provided a compensating means, which may be spring means of the torsional kind, operable to supplement or modify the spring effort or resistance of the main spring means so as to levelize the frame under conditions where an increase in static load is placed at one or either end of the vehicle. In the use of a main spring suspension common to the front and rear wheels and operable as above described a change in static load adjacent the rear or front of the vehicle has the effect of varying the riding height in opposite directions of the front and rear, thus putting the frame or vehicle out of level. The compensating means, one form of which is incorporated in the illustrated embodiment, functions under such conditions to restore the frame or vehicle to substantially a level position. A substantially uniform riding height of the vehicle body may thus be assured regardless of varying loads carried thereby.

In the embodiment herein illustrated the front wheels of the vehicle are supported for independent up and down movements by means of upper and lower swinging suspension arms or levers. Although the rear wheels are shown as supported by means of swing axles for independent vertical movement it will be understood that they may be otherwise supported, such as through the medium of a solid axle or upper and lower swinging suspension arms or levers for each rear wheel.

The load compensating means incorporated in the illustrated embodiment preferably comprises a torsional spring or torsion bar supplementing or capable of modifying the effective effort of each main torsion bar. The compensating springs, as herein shown by way of example, may be connected to a pair of rear wheel levers which may also be connected to the main torsion bars when utilized as the main spring suspension means. These compensating springs may be torsionally deflected as the result of static load changes on the vehicles so as to levelize the vehicle, this being accomplished in the present embodiment through the medium of variable leverage mechanism which is preferably power operated, such as by means of a servo-motor which may be electrically actuated or otherwise. Actuation of the motor is preferably performed automatically in response to static load changes occurring after a predetermined elapsed interval of time. A delayed action switch means is utilized in the present instance to control operation of the compensating motor in either direction, and when so operated the compensating springs will be torsionally deflected in one direction or the other through the variable lever mechanism.

An important feature of the present invention resides in the provision of means for restraining or preventing operation of the load compensating means when the vehicle is forced out of level during deceleration or acceleration of the vehicle. It is known that during acceleration there is a transfer of weight to the rear of the vehicle and during deceleration (such as during application of the brakes) there is a transfer of weight to the front of the vehicle. In each instance, unless provision is otherwise made, the vehicle dips at one end and remains in a tilted or out of level condition for some interval of time. If this interval of time during which the vehicle is tilted forward or backward consequent to deceleration or acceleration is of a duration exceeding the delay or dwell of the delayed action switch, the undesirable result would be the actuation of the compensating mechanism to level the vehicle. Accordingly, to preclude operation of the load compensating mechanism when the vehicle is accelerated or decelerated there is provided a means for restraining or preventing the switch at this time from actuating the compensating motor. This is accomplished in the illustrated embodiment by incorporating in the switch mechanism an inertia means or device responsive to deceleration or acceleration of the vehicle and which induces a braking, retarding or restraining action on the switch sufficient to prevent its actuation of the compensator motor.

Other objects of this invention will appear in the following description and appended claims, reference being had to the accompanying drawings forming a part of this specification wherein like reference characters designate corresponding parts in the several views.

Fig. 1 is a fragmentary plan view of a motor vehicle chassis provided with a vehicle spring suspension constructed in accordance with the present invention.

Fig. 2 is an enlarged fragmentary sectional elevation taken substantially through lines 2—2 of Fig. 1 looking in the direction of the arrows.

Fig. 3 is an enlarged fragmentary sectional elevation taken substantially through lines 3—3 of Fig. 1 looking in the direction of the arrows.

Fig. 4 is an enlarged sectional elevation taken substantially through lines 4—4 of Fig. 1 looking in the direction of the arrows.

Fig. 5 is an enlarged fragmentary sectional plan view taken substantially through lines 5—5 of Fig. 4 looking in the direction of the arrows.

Fig. 6 is an enlarged sectional elevation taken substantially through lines 6—6 of Fig. 4 looking in the direction of the arrows.

Fig. 7 is an enlarged fragmentary section taken substantially through lines 7—7 of Fig. 6 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the accompanying drawings, there is illustrated, by way of example, a vehicle chassis having road wheels supporting the frame or body through the medium of a spring suspension which in the present embodiment is preferably of the torsional or torsion bar kind. In the interest of clarity the vehicle superstructure or body and details of the power plant and driven mechanisms have been largely omitted from the drawings.

As illustrated, the chassis or body frame is shown, by way of example, as comprising spaced longitudinal sills or main frame members 15 of box-like tubular construction rigidly connected together by means of suitable cross frame members 16, 17, 18 and 23. In the present instance the chassis also comprises longitudinal outrigger frame members 19 disposed between the front and rear wheels and joined together by means of cross frame members 20, 21 and 22 which are rigidly attached to the main frame members 15. The illustrated frame construction is particularly useful for an automobile having a unitary body and frame structure wherein, for example, the front upright body pillars are attached at their lower ends to the junctures of the frame members 19 and 20. The vehicle is provided with a pair of front dirigible wheels 24 and a pair of rear driven wheels 25.

Each front wheel 24 is supported for independent up and down movement according to conventional practice by means of upper and lower swinging suspension arms or levers which are preferably of wishbone or fork-like construction. The upper relatively short suspension arms are indicated at 26 and each is pivoted at longitudinally spaced points 27 to suitable brackets on one of the main frame members 15. The outer end of each upper suspension arm or lever 26 is pivotally connected to a spindle and king pin mounting 28 of suitable type. The relatively long lower suspension arm or lever for each front wheel 24 is indicated at 29 and in the present instance comprises wide angle diverging spaced arms or fork members 29a and 29b. The inner end of the front arm member 29a of each lower suspension arm is pivoted at 30 to the cross frame member 16 and the inner end of the rear arm member 29b is pivoted at 31 to the cross frame member 17. The outer converging ends of the arm members 29a and 29b are joined together and are pivotally connected to the adjacent spindle and king pin mounting 28.

Steering control is provided at the front wheels 24 through the spindle and king pin mountings or carriers 28 by any conventional type of steering mechanism, such as that generally illustrated, by way of example, at 32 in Fig. 1.

Although it will be understood that the rear driven wheels 25 may be supported in any conventional manner for up and down motion, in the present instance these wheels are supported through the medium of swinging half axle or driven shaft members 33. Each axle or shaft member 33 for a rear wheel 25 has a rotative bearing at its outer end in a rigid non-rotative wheel support 34. The inner end of each driven axle shaft 33 is connected to a universal joint 35 supported by a bracket rigidly secured to the side of the differential housing 36 which is carried by the cross frame members 18 and 23. As in conventional practice, the differential mechanism is operated from the propeller shaft of the vehicle and in the present instance the differential mechanism drives the axle shafts 33 which in turn are drivingly connected to the wheels 25. Each rear wheel 25 is also supported for independent vertical motion through the medium of a torque arm 37 the rear end of which is rigidly attached to the wheel support 34. Each torque arm 37 extends forwardly from the wheel and also inclines upwardly and the forward end thereof is pivoted at 38 to a bracket 39 attached to the cross frame member 22. The pivotal axis at 38 of the forward end of each torque arm 37 extends obliquely and inclines to a suitable degree rearwardly and downwardly as indicated by the broken line 40 and passes through the pivotal axis of swinging at 35 of the associated swing axle shaft 33. From the foregoing it will be seen that each rear wheel 25 in the present embodiment will be effectively controlled for a vertical motion by a swing axle shaft 33 and torque arm 37 and will swing up and down about the oblique inclined axis 40.

The main spring suspension for the vehicle comprises a longitudinal torsion bar 41 connected to the front and rear wheels 24 and 25 at each side of the vehicle. The main torsion bars 41 may, as desired, be of solid or tubular construction and when installed are initially stressed by winding or twisting them angularly a predetermined amount up to, for example, eighty to ninety degrees so as to support the sprung weight of the vehicle. As illustrated in Fig. 1, the forward ends of the main torsion bars 41 terminate proximate to the junctures of the frame members 19 and 20. The forward end of each main torsion bar is upset to provide an enlarged hex portion 41a splined or keyed within a correspondingly shaped socket or sleeve 42 rotatable within a bearing 43 in a bracket 44 attached to and depending from the adjacent longitudinal frame member 19. Thus, the forward end of each main torsion bar is rotatably supported within a frame bracket 44 and the enlarged hex end of the torsion bar projects through the bracket and is keyed or anchored in a correspondingly shaped socket in the outer end of a swinging lever arm 45. This lever arm for each main torsion bar is connected at its inner end to the lower end of a hanger link or rod 46 and the upper end of the rod is connected to a bracket 47 rigidly secured at an intermediate point to the arm member 29b of the adjacent lower suspension arm 29. The connections at opposite ends of the rod or link 46 may be articulated or may embody rubber or resilient material to provide for the required amount of flexibility at these points. It will be understood that upward vertical motion of a front wheel will be transmitted by the lower suspension arm member 29b through the link 46 to the inner end of the lever arm 45 thereby swinging this lever arm in an upward direction and causing the outer end of the lever arm to rotate or torsionally deflect angularly the torsion bar 41 to which it is attached. Due to the restoring action of the spring torsion bar, which at all times is under torsional stress, the inner end of the lever arm will swing downwardly when the front wheel is displaced in a downward direction, this downward motion of the inner end of the lever arm at its connection with the link 46 being accompanied by corresponding motion of this link and the lower suspension arm member 29b.

The rear ends of the main torsion bars 41 are also upset to provide enlarged hex end portions 41b which extend through the lower ends of suitable hanger brackets depending from and rigidly attached to the cross frame member 23. These rear hex ends 41b of the main torsion bars have rotatable bearings within the brackets similarly to the forward ends of the torsion bars, as shown in Fig. 3. These hex ends 41b are anchored or keyed rigidly within correspondingly shaped sockets in the inner ends of swinging lever arms 48. The outer end of each lever arm 48 has an interlocking connection with the lower end of a vertical link or rod 50, the upper end of which is connected to a bracket 51 attached to the wheel support 34. The connections between the outer ends of the lever arms 48 and the brackets 51 are similar to the connections between the inner ends of the front lever arms 45 and the brackets 47. Similarly, the connections at opposite ends of the links or rods 50 with the lever arms 48 and brackets 51 are articulated or resilient so as to provide for the required amount of flexibility at these points. Vertical motion of each rear wheel 25 and swing axle shaft 33 will swing the associated lever arm 48, and this operation will result in torsionally deflecting angularly or twisting the rear end of the torsion bar 41.

It will be noted that the swinging lever arms 45 and 48 attached to the front and rear ends of each main torsion bar 41 extend in opposite or opposed directions inwardly and outwardly respectively from the main torsion bar. Hence, it will be understood that these lever arms will torsionally deflect angularly or twist the torsion bar 41 in opposite directions in response to corresponding vertical motions of the front and rear wheels. In other words, up and down movement of a front wheel or a rear wheel will result in angular torsional deflection of the main torsion bar 41 in directions opposite to the angular torsional deflection thereof produced by corresponding up and down movement of the other wheel at the same side of the vehicle. As a consequence, either arm or lever 45 or 48 is effective to torsionally deflect angularly the torsion bar 41 in opposition to the other arm or lever, thereby to transmit vertical forces in corresponding directions to the frame adjacent opposite ends thereof in response to vertical motion of either wheel.

In the present embodiment of the invention the main spring suspension comprising the torsion bars 41 is supplemented by compensating means, preferably spring means of the torsional kind, at each side of the vehicle operable to vary or modify the spring effort or resistance of the main spring means so as to maintain the frame substantially level under conditions where changes in static load occur at one end or the other of the vehicle. In the present instance the compensating means is provided at the rear of the vehicle and comprises a torsion bar 52 for each rear wheel. The spring torsion bars 52, as in the case of the main torsion bars 41, are selected as to cross-sectional size and torsional characteristics to suit the particular vehicle, each compensating torsion bar being preferably of less diameter or cross-sectional size than the associated main torsion bar since normally it is only required to exert appreciably less torsional resistance than the associated main torsion bar.

In the present embodiment each compensating torsion bar 52 extends parallel to and alongside the associated main torsion bar 41 and the rear end is upset to provide an enlarged hex portion 52a keyed or rigidly secured at 53 within a correspondingly shaped socket adjacent the inner end of the lever arm 48. The forward end of each compensating bar 52 is provided with a similar enlarged hex portion keyed or rigidly secured within a hex socket 54 in the lower end of a vertical lever 55. Each bar 52 extends through the lower end of the lever 55 and has a rotatable bearing in a suitable bracket secured to the cross frame member 21. A longitudinally adjustable link 57 is connected at its outer end to the upper end of the lever 55 (Fig. 2). The link 57 has an articulated connection at 58 with the lever 55. The inner end of the link 57 is pivotally connected at 59 to a sector gear 60 journalled at 61 on a bracket 62 bolted to the cross frame member 21. The pivotal connection 59, as seen in Fig. 1, is spaced a suitable distance at one side of the pivotal mounting 61 of the sector gear 60. This gear meshes with a pinion 63 carried by the bracket 62, this pinion being fixed to a large worm gear 64 which in turn meshes with a worm 65 carried by the armature shaft of an electric servo-motor 67. This motor is carried by a bracket bolted to the side of one of the main frame members 15. A second transmitting link 69 is pivoted at 70 to the sector gear 60, the pivotal connection thereof, as seen in Fig. 1, being spaced from the pivot 61 of the gear at the side thereof opposite to the pivotal connection 59. The outer end of the link 69 has an articulated connection at 71 to the upper end of a lever, identical to the lever 55, which is attached at its lower end to the associated compensating torsion bar. It will thus be understood that the connections between the outer ends of the transmitting links 57 and 69 to the compensating torsion bars 52 are identical and are through the medium of swinging levers 55 as shown in Figs. 1 and 2. In the present instance the reduction gearing connected to the inner ends of the links 57 and 69 is arranged at one side of the longitudinal center line of the frame so as to provide clearance for the driven or propeller shaft of the vehicle. However, it will be understood that this mechanism may be arranged centrally and the links 57 and 69 may be of the same lengths.

The compensating motor 67 for driving the reduction gearing 60, 63, 64 and 65 so as to shift the transmitting links 57 and 69 simultaneously outward or inward in order to swing the levers 55 and torsionally deflect angularly the compensating torsion bars 52 and provide the desired angular adjustments thereof to compensate for changes in static load, is actuated in one direction or the other through any suitable delayed action switch mechanism, such as generally indicated at 72 in Fig. 4, contained in a suitable casing 73. A rock shaft 74 extends through one side wall of the casing and is supported in a bearing 75, see Fig. 6. Freely mounted on the inner end of the shaft 74 and depending therefrom are a pair of parallel arms 76. Interposed between these arms is a depending crank arm 77 pinned to the rock shaft 74. A transmitting spring 78 is coiled around the shaft 74 at opposite sides of the arms 76. The opposite ends of the spring 78 are connected to a bar 79 bearing against the arms 76 at one side thereof. The intermediate portion of the spring 78 is formed as a loop 80 bearing against the arms 76 at the opposite side thereof. From this construction it will be seen that rotation of the rock shaft 74 in one direction or the other will swing the arms 76 in a corresponding direction, the effort of the rock shaft being transmitted by crank arm 77 to the arms 76 through the spring 78. The lower ends of the arms 76 are pivotally connected to one end of a link 81, the opposite end of which is pivoted to a projecting lever arm portion 82 on a swinging switch lever 83 pivotally connected at 84 to a bracket 85 attached to one side wall of the casing 73. The switch lever 83, as seen in Fig. 4, has a projecting contact arm 86 interposed between but spaced equally from a pair of electrical contacts 87 and 88 connected by means of conductor wires 89 and 90, respectively, to the terminal ends of the electric servo-motor 67. The contact arm 86 is grounded to the casing by means of a wire 91. Pivotally connected to the end of the switch lever 83 at the opposite side of the pivot 84 from the contact arm 86 is a vertical link 92 pivotally connected at its upper end to a dash pot piston 93 reciprocable vertically within a cylinder 94. The piston and cylinder provide a pneumatic dash pot. The upper end of the cylinder is provided with a threaded cap 95 having an air bleed hole 96. An anti-clog wire 97 extends downwardly freely through the bleed hole 96 and is effective to maintain the hole free of obstruction. The dash pot operates in known fashion and produces a delayed action for swinging movement of the switch lever 83, the length of time of this delayed action being governed by the size of the air bleed hole 96 in the dash pot cylinder. A counterbalancing spring 98 is connected to the switch lever 83 at one end and at its opposite end to a wall of the casing 73, this spring functioning to balance the weight of the dash pot piston 93 and link 92.

Attached to the outer end of the rock shaft 74 is a vertical lever arm 99 to the upper end of which is pivoted a horizontally extending link 100 adjustable as to length by a turnbuckle device 100a. The outer end of this link is pivotally connected to the upper end of a lever arm 101 which is rigidly attached at its lower end to one of the main torsion bars 41. The connection of the lever 101 to the main torsion bar is preferably located at or close to the neutral point of the main torsion bar, namely, the point at or near the middle of the bar at which point no torsional twist or deflection of the bar occurs when both ends of the bar are twisted corresponding amounts in opposite directions by the levers attached thereto. The neutral point may also be defined as the point where no torsional deflection of the main torsion bar occurs whenever there is no relative change in elevation of the front and rear of the vehicle frame or body structure.

Incorporated in the delayed action switch mechanism mounted within the casing 73 is a means for restraining or preventing operation of the load compensating means when the vehicle is forced out of level during deceleration or acceleration of the vehicle. In accordance with the present embodiment of the invention this is accomplished by inertia means adapted to act upon or against the switch lever 83. As illustrated particularly in Figs. 4 and 5, an inertia lever 102 is provided below the switch lever 83. The inner end of the inertia lever is pivoted at 103 to the bracket 85 so as to permit the outer end of the lever to swing forwardly or rearwardly in the manner illustrated in broken lines in Fig. 5. The inertia lever 102 has a lever portion 102a laterally offset from the pivot 103 and formed with an upstanding hook-like finger 104 projecting into a space between a pair of depending lugs 105 and 106 on the switch lever 83. The outer end of the inertia lever 102 carries a suitable weight 107. During deceleration of the vehicle the inertia lever will swing forwardly, as indicated by the upper broken line position shown in Fig. 5, thereby moving the finger 104 against the lug 106 and preventing upward swinging movement of the switch lever 83. Conversely, during rapid acceleration of the vehicle the inertia lever 102 will swing backward, as indicated by the lower broken line position thereof in Fig. 5, and thereby move the finger 104 against the lug 105, thus restraining downward swinging movement of the switch lever 83. With the switch lever thus restrained by the inertia lever 102 during rapid deceleration or acceleration of the vehicle the contact arm 86 is prevented from moving vertically in one direction or the other to effect contact with either the contact 87 or the contact 88. Hence, under such conditions operation of the electric servo-motor 67 is prevented. During normal operation it will be understood that when the rear of the frame is depressed by the addition of a static load thereto the main torsion bar 41, to which the lever arm 101 is attached, will be torsionally turned or rotated a predetermined number of degrees angularly so as to swing the lever arm 101 clockwise as seen in Fig. 4. This motion of the lever will be transmitted by link 100 to lever 99 and thence through spring 78 to lever arm 76 and link 81 to the switch lever 83. The force thus exerted to swing the switch lever is resisted by the dash pot piston 93 and after a predetermined delay or interval of time the contact arm 86 will be moved upwardly into position to engage the contact 87 and thereby actuate the electric servo-motor 67. This will result in swinging the levers 55 a predetermined amount to torsionally deflect angularly the compensating torsion bars 52. These torsion bars acting on the lever arms 48 will increase the spring resistance at the rear end of the vehicle thereby raising the rear end and through the main torsion bars 41 acting upon levers 45 lowering the front end of the vehicle. When the vehicle reaches a level position the main torsion bar 41 to which the lever 101 is attached will return this lever to its normal position shown in Fig. 4 thus interrupting the electrical circuit to the servo-motor and stopping operation thereof. The reverse of the foregoing operation will occur when a decrease in static load occurs at the rear of the vehicle. Similarly, the electric motor 67 will be operated in one direction or the other when a change in static load occurs at the front of the vehicle. Thus, the compensating means will function to levelize the vehicle as a result of any relative changes in elevation of the front and rear of the vehicle consequent to changes in static load at either end thereof, this being due to the fact that the main torsion bars are responsive to such relative changes in elevation and the control lever 101 for the compensating switch in response to turning or rotation of the main torsion bar 41 to which it is attached.

It will be seen from the foregoing that a single operating unit, including reduction gearing 60, 63, 64 and 65, is provided for both compensating torsion bars 52. The worm 65 driven by the reversible electric motor 67 has a self-locking action in respect to the worm gear 64 and, hence, the torsion bars 52, which are simultaneously adjusted torsionally in opposite directions upon operation of the electric motor, are locked in any angular adjusted position thereof, such adjusted position between the limits of swinging movement of the levers 55 (Fig. 2) being determined by the degree of compensating effort required to bring the vehicle to a level position. Such compensating effort may be in opposition to the main torsion bars 41 or may be for the purpose of suplementing the same.

I claim:

1. In a vehicle having a frame structure and front and rear wheels, longitudinally extending torsional spring means common to a front and a rear wheel and connected thereto, yieldable means associated with said spring means and effective to supplement or modify the effort of said spring means to compensate for static load changes on the frame structure, power actuated means for varying the compensating effort of said yieldable means, delayed action control means for controlling the operation of said power actuated means, means for operating said control means from said torsional spring means, and means operatively associated with said control means and responsive to vehicle inertia during travel of the vehicle for restraining operation of said control means upon predetermined acceleration or deceleration of the vehicle.

2. In a spring suspension for a vehicle having a frame and front and rear wheels, spring means connected to said wheels, yieldable means associated with said spring means and effective to supplement or modify the effort of said spring means to compensate for static load changes on the frame, actuating means for varying the compensating effort of said yieldable means, and means operatively associated with said actuating means and responsive to inertia of the vehicle during travel of the vehicle for delaying operation of said actuating means.

3. In a spring suspension for a vehicle having a frame and front and rear wheels, torsional spring means connected to said wheels, yieldable means associated with said spring means and effective to supplement or modify the effort of said spring means to compensate for static load changes on the frame, means including an electric motor for varying the compensating effort of said yieldable means, delayed action switch means for controlling operation of said motor, and means operatively associated with said switch means and responsive to inertia of the vehicle during travel of the vehicle for restraining action of said switch means.

4. In a spring suspension for a vehicle having a frame and front and rear wheels, longitudinal torsional spring means, lever arm means connecting each wheel to said spring means and operative in conjunction therewith to displace the front and rear of the frame in corresponding directions upon vertical displacement of a front wheel or a rear wheel, compensating means associated with said spring means for supplementing or modifying the effective effort of said spring means to levelize the frame under varying static load conditions, means for controlling the operation of said compensating means, and means responsive to inertia of the vehicle for restraining the operation of the compensating means during predetermined acceleration or deceleration of the vehicle.

5. In a spring suspension for a vehicle having a frame and front and rear wheels, longitudinal torsional spring means, lever arm means connecting each wheel to said spring means and operative in conjunction therewith to displace the front and rear of the frame in corresponding directions upon vertical displacement of a front wheel or a rear wheel, compensating means associated with said spring means for supplementing or modifying the effective effort of said spring means to levelize the frame under varying static load conditions, means actuated from said torsional spring means for controlling the operation of said compensating means, and means responsive to inertia of the vehicle for restraining the operation of the compensating means during predetermined acceleration or deceleration of the vehicle.

6. In a spring suspension for a vehicle having front and rear wheels, longitudinal torsional spring means common to said wheels, means connecting said spring means to the wheels to provide for displacement of opposite ends of the frame in corresponding directions upon vertical displacement of one wheel or the other, compensating means associated with said spring means for varying the spring effort to compensate for changes in static loads on the vehicle, control means for said compensating means, a swingable member connected to said torsional spring means for actuating said control means, and means operatively associated with said control means and responsive to inertia of the vehicle during travel thereof for delaying actuation of said control means.

7. In a vehicle having main yieldable suspension means associated with wheels of the vehicle, compensating means effective to supplement or modify the effort of said suspension means to compensate for changes in static load on the vehicle and levelize the vehicle, and a servo-motor for operating said compensating means; delayed action electric switch means for controlling the operation of the servo-motor, and means responsive to inertia of the vehicle upon acceleration or deceleration of the vehicle during travel thereof and operatively associated with said switch means for rendering the same ineffective to actuate said servo-motor.

8. In a vehicle having main yieldable suspension means associated with wheels of the vehicle, compensating means effective to supplement or modify the effort of said suspension means to compensate for changes in static load on the vehicle and levelize the vehicle, and power actuated means for operating said compensating means; delayed action control means for controlling the operation of the power actuated means, and means responsive to inertia of the vehicle upon acceleration or deceleration of the vehicle during travel thereof and operatively associated with said control means for rendering the same ineffective to actuate said power actuated means.

9. An electric switch device for controlling the operation of a servo-motor operatively associated with a load compensating means for the spring suspension of a vehicle, comprising control means for controlling the operation of said servo-motor including an electric circuit, a fixed contact in said circuit, a movable contact member normally spaced from said contact, means for moving said contact member into engagement with said contact to complete the circuit, and means responsive to inertia of the vehicle upon acceleration or deceleration of the vehicle during travel thereof for restraining engagement of said contact member with said contact.

10. An electric switch device for controlling the operation of a servo-motor operatively associated with a load compensating means for the spring suspension of a vehicle, said switch device comprising an electric control circuit for controlling the operation of the servo-motor, control means responsive to a change in static load on the vehicle for controlling the energization of said circuit, delayed action means for delaying energization of said circuit for a predetermined interval of time, and means responsive to inertia of the vehicle upon acceleration or deceleration of the vehicle during travel thereof for restraining actuation of said control means.

11. In a vehicle having pairs of front and rear wheels and a load carrying frame supported thereon through the medium of main yieldable suspension means; load compensating yieldable means effective to supplement or modify the effort of said suspension means to compensate for static load changes on the frame, power actuated means for varying the compensating effort of said yieldable means, control means for controlling the operation of said power actuated means, and means operatively associated with said control means and responsive to vehicle inertia during travel of the vehicle for restraining operation of said control means at predetermined times.

References Cited in the file of this patent

UNITED STATES PATENTS

| | | |
|---|---|---|
| 2,115,072 | Hunt | Apr. 26, 1938 |
| 2,191,211 | Krotz | Feb. 20, 1940 |
| 2,405,250 | Wolf | Aug. 6, 1946 |
| 2,607,611 | Allison | Aug. 19, 1952 |
| 2,687,311 | Nallinger | Aug. 24, 1954 |
| 2,778,656 | May | Jan. 22, 1957 |